United States Patent [19]
Locati

[11] Patent Number: 5,463,934
[45] Date of Patent: Nov. 7, 1995

[54] AUTOMATIC COFFEE MACHINE FOR DELIVERING COFFEE ALONE OR, COMBINED WITH MILK, IN THE FORM OF CAPPUCCINO

[75] Inventor: Santino Locati, Milan, Italy

[73] Assignee: Cimbali S.p.A., Binasco, Italy

[21] Appl. No.: 187,209

[22] Filed: Jan. 26, 1994

[30] Foreign Application Priority Data

Jan. 27, 1993 [IT] Italy .................. MI93A0130

[51] Int. Cl.⁶ ...................................... A47J 31/42
[52] U.S. Cl. ............................. 99/286; 99/289 R
[58] Field of Search ................... 99/286, 279, 295, 99/289 R, 299, 300; 426/433

[56] References Cited

U.S. PATENT DOCUMENTS

| | | | |
|---|---|---|---|
| 4,172,413 | 10/1979 | Roseberry | 99/286 |
| 4,876,953 | 10/1989 | Imamura | 99/286 |
| 5,083,502 | 1/1992 | Enomoto | 99/286 |

*Primary Examiner*—Robert W. Jenkins
*Attorney, Agent, or Firm*—Collard & Roe

[57] ABSTRACT

Automatic machine for a coffee beverage, deliverable as coffee alone or, combined with milk, in the form of cappuccino, in which the unit, formed by the coffee grinder, its grinding chamber, and a channel chute, is capable of being moved.

7 Claims, 5 Drawing Sheets

AUTOMATIC COFFEE MACHINE FOR DELIVERING COFFEE ALONE OR, COMBINED WITH MILK, IN THE FORM OF CAPPUCCINO

BACKGROUND OF THE INVENTION

1. Field of the Invention

The present invention relates to an automatic coffee machine in which the coffee beans coming from a feeder are reduced to powder in the grinding chamber of a grinder, from which the ground coffee powder reaches an infusion or brewing chamber, in which the coffee powder is compressed between an infuser piston and a filter piston and from which the coffee exits as a beverage, deliverable alone or, combined with milk, in the form of cappuccino.

SUMMARY OF THE INVENTION

It is an object of the present invention to construct an automatic coffee brewing machine in as simple a manner as possible.

It is a further object of the invention to provide a means for easily regulating the volume of the grinding chamber in an automatic coffee machine.

These and additional objects and advantages of the present invention are achieved primarily by the fact that the unit, formed by the grinder, its grinding chamber and a channel chute, is capable of being moved, preferably horizontally, between an initial position in which the coffee beans can enter from the feeder into the grinding chamber, and a final position, in which the ground coffee can pass from the grinding chamber, through the channel chute, into the infusion chamber.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
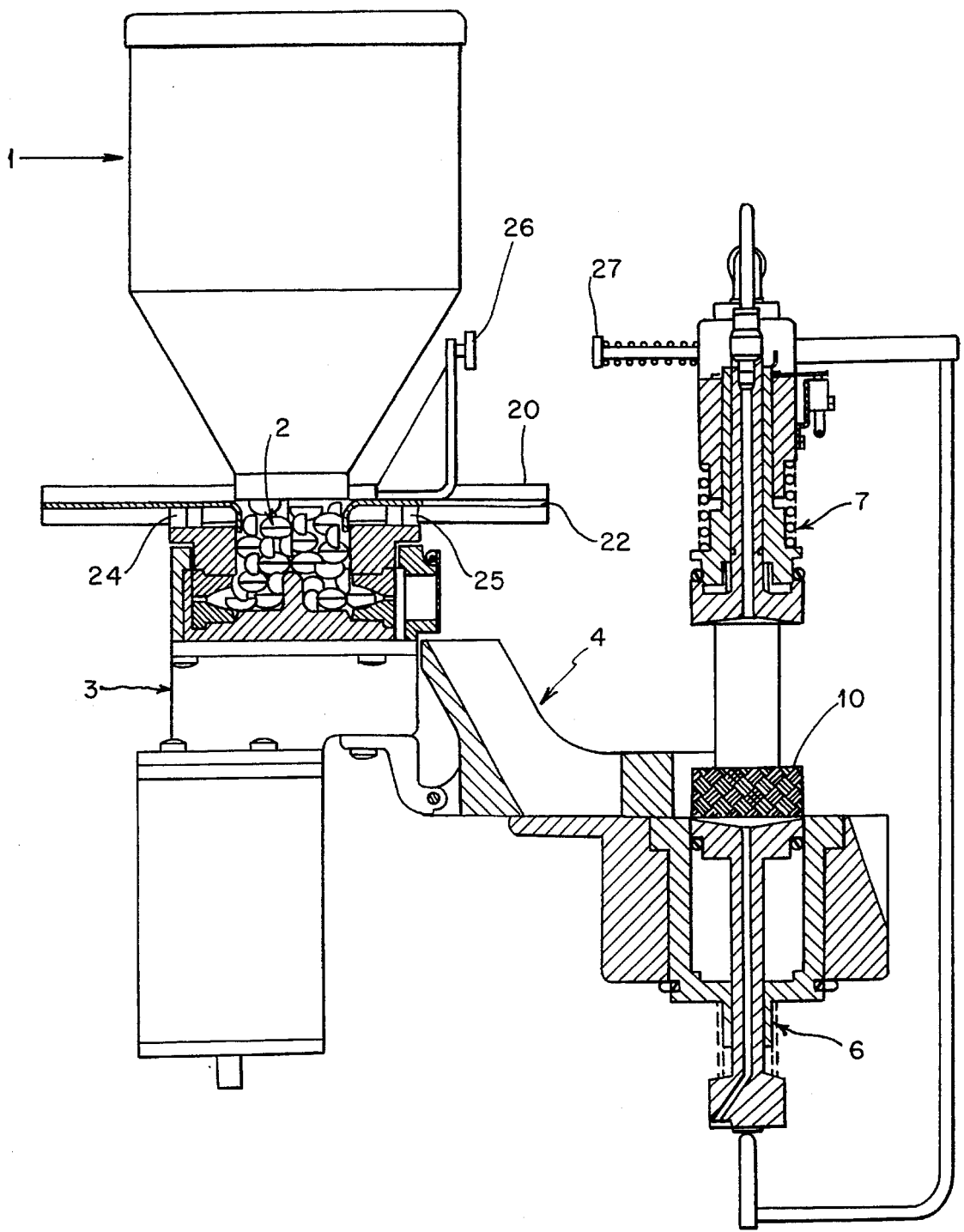
FIG. 1 shows an automatic coffee machine with the grinding unit in the initial position.

Turning now in detail to the drawings, FIG. 1 shows the grinding chamber 2 of the grinder 3 full of coffee beans coming from feeder 1 in the initial position.

Figure 5:
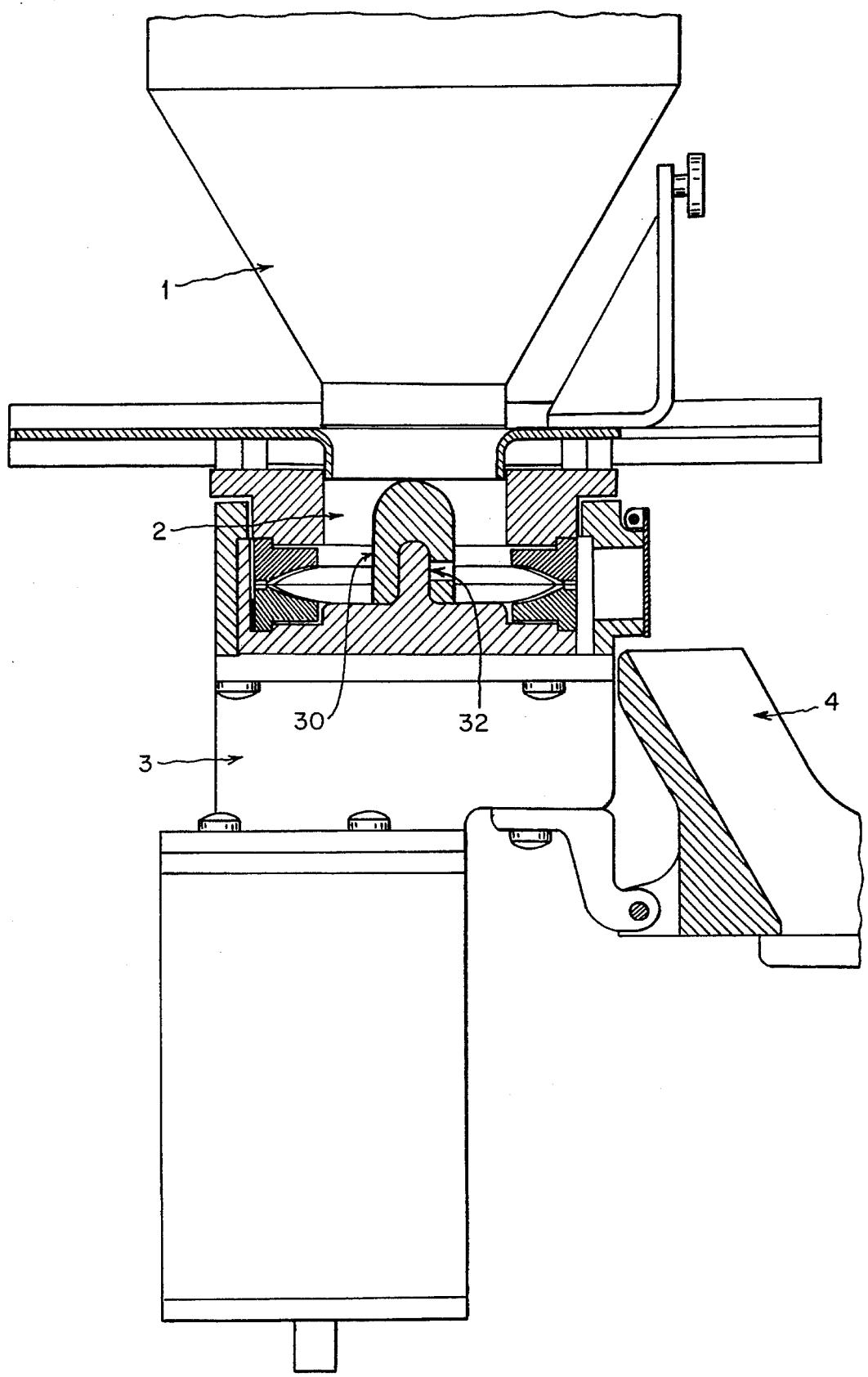
FIG. 5 shows a means for changing the useable volume of the grinding chamber.

As illustrated in FIG. 5, the useable volume of the grinding chamber 2 is adjustable, for example, so as to contain from 6 to 10 grams of coffee beans.

Figure 2:
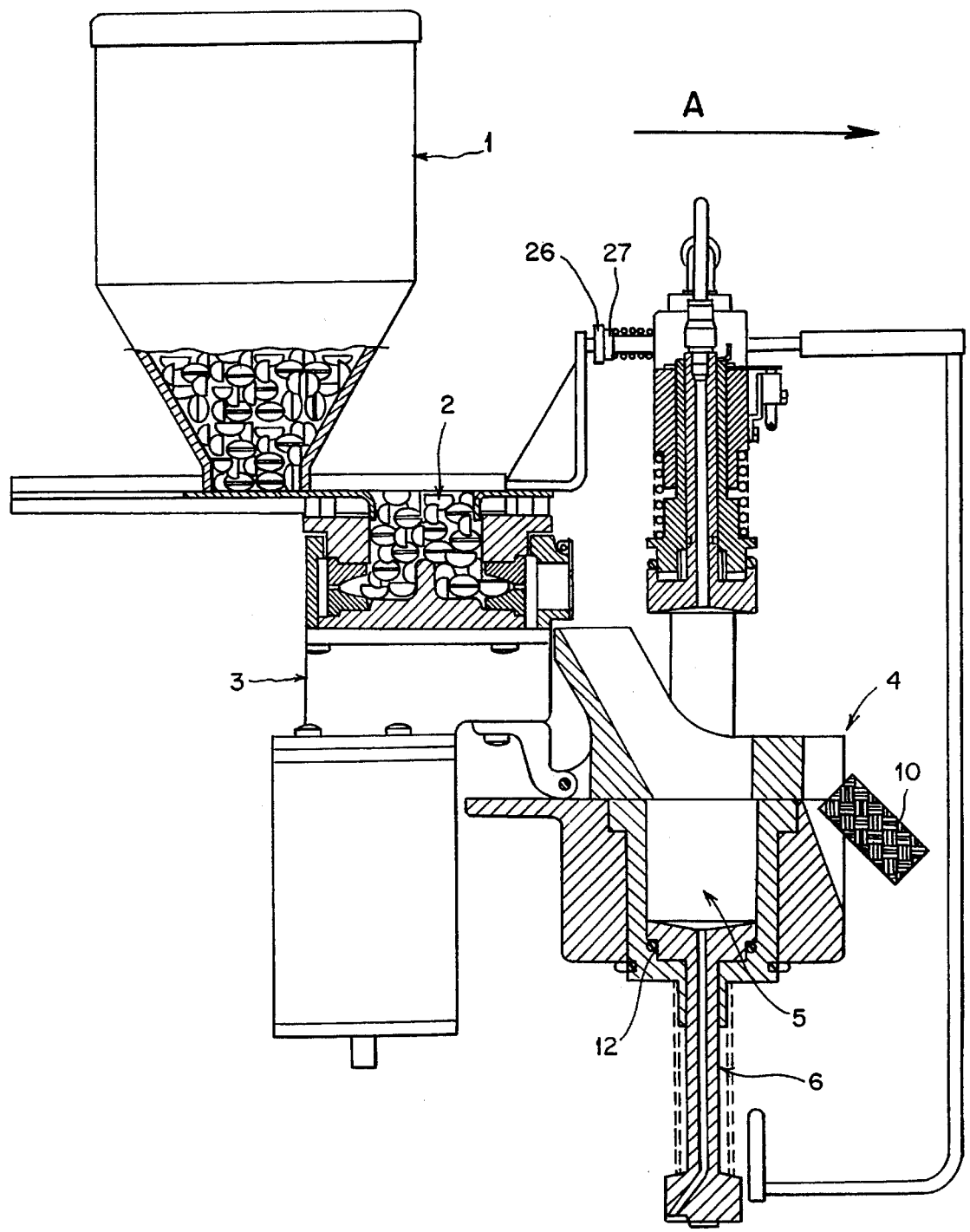
FIG. 2 shows the unit of FIG. 1 in the final position.

After pressing the button (not shown) for the delivery of the coffee beverage alone, or of cappuccino, the grinding unit, formed by the grinder 3, its grinding chamber 2 and a channel chute 4, is moved from its initial position so as to assume the final position shown in FIG. 2. Means for moving the grinding unit includes horizontal track 20 containing horizontal groove 22 into which is fitted roller support wheels 24 and 25. Stop arms 26 and 27 limit the extent to which the grinder unit moves horizontally (FIG. 2). A known motor for moving the grinding unit is not shown.

The moving of grinding unit 2, 3, 4, as indicated by arrow A, causes the following operations to occur. As seen in FIG. 2, there is the expulsion of the tablet 10 of compressed and spent coffee grinds; there is the release of the filter piston 6, which drops to the bottom 12 of the chamber 5; there is the positioning of channel chute 4 above the infusion chamber 5, to facilitate the introduction of freshly ground coffee; and there is the separation of the quantity of coffee beans to be ground contained in grinding chamber 2.

Figure 3:
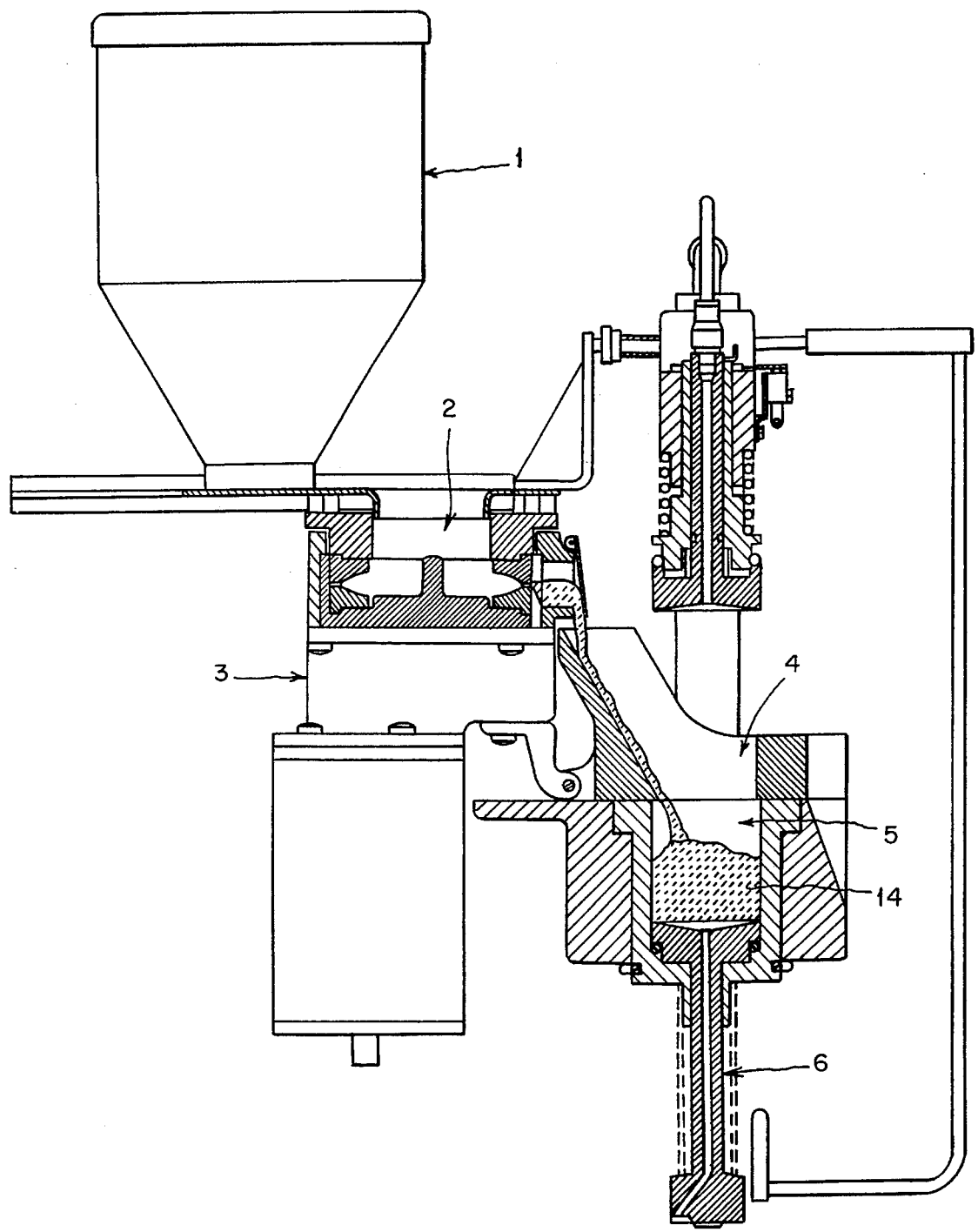
FIG. 3 shows the infusion chamber of FIG. 1 in the refilling position.

As seen in FIG. 3, the grinder 3 is put into operation for a programmed period of time, so as to ensure complete grinding of the coffee beans contained in grinding chamber 2, and then deposits the ground coffee powder 14 directly in the infusion chamber 5.

Figure 4:
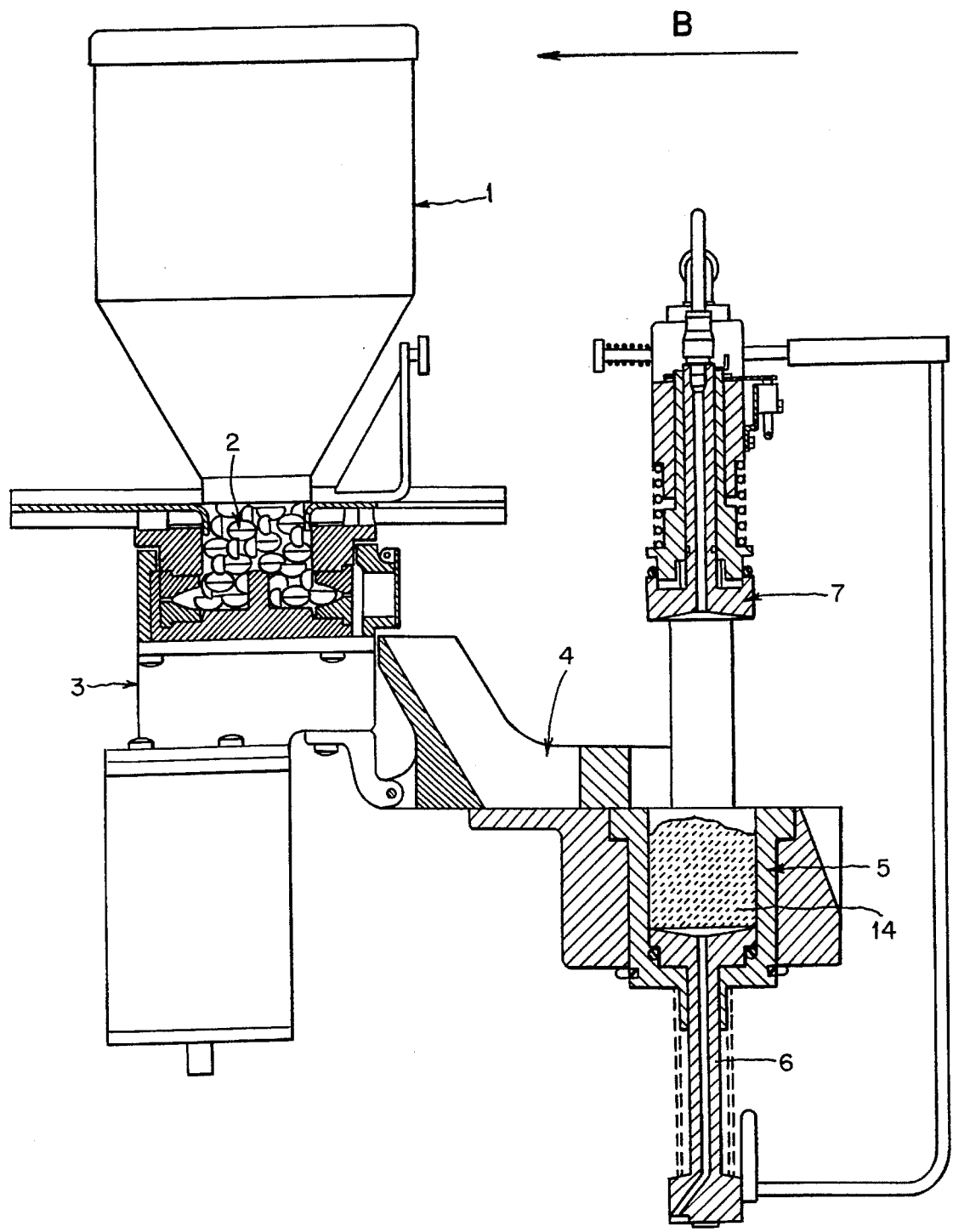
FIG. 4 shows the return of the grinding unit to the initial position.

As seen in FIG. 4, after grinding is completed, the grinder 3 returns to the starting point initial position as indicated by arrow B, and grinding chamber 2 is again filled with the above-mentioned quantity of coffee beans coming from feeder 1. The coffee powder 14 is then compressed between infuser piston 7 and coffee piston 6.

The objects and advantages of this invention are achieved by constructing the automatic coffee machine in as simple a manner as possible, whereby there is reciprocating rectilinear movement of grinding unit 2, 3, 4 and, in a preferred specific embodiment, because the forward (arrow A) and return (arrow B) movement of the grinding unit is utilized to accomplish the following four operating steps:

(1) releasing the filter piston 6;

(2) positioning the channel chute 4 for the introduction of the ground coffee powder into the infusion chamber 5;

(3) measuring out the coffee beans to be ground; and (4) expulsion of the tablet of compressed and spent coffee grounds.

FIG. 5 shows a preferred embodiment for changing the volume of grinding chamber 2. A body 30, which can be inserted into grinding chamber 2, reduces the useable volume of this chamber, by occupying part of said chamber, and consequently the quantity of coffee to be ground can be varied. Insert body 30 has the shape of an inverted U, and is held in place by pin 32.

While several embodiments of the present invention have been shown and described, it is to be understood that many changes and modifications may be made thereunto without departing from the spirit and scope of the invention as defined in the appended claims.

What is claimed is:

1. Automatic coffee machine comprising a feeder containing coffee beans;

a grinder having a grinding chamber in which beans coming from the feeder are reduced to a powder in the grinding chamber of the grinder;

an infusion chamber into which the coffee powder is deposited;

an infuser piston and a filter piston, and in said infusion chamber, means for compressing the coffee powder between said infuser piston and said filter piston and from said infusion chamber the coffee exits as a beverage, a grinding unit comprises said grinder, said grinding chamber adjacent to a channel chute; and means for supporting said grinding unit for movement between an initial position in which the coffee beans can enter from the feeder into the grinding chamber and a final position in which the ground coffee can pass from the grinding chamber through the adjacent channel chute into said infusion chamber.

2. Automatic coffee machine according to claim 1, wherein said means for moving moves the grinder into its final position for operation for a determined period of time, so as to ensure complete grinding of the coffee beans contained in grinding chamber, depositing the ground coffee directly in the infusion chamber.

3. Automatic coffee machine according to claim 1, wherein said supporting means for movement of the grinder unit has a stop arm;

wherein said infuser piston has a stop arm;

wherein said supporting means for movement of the grinder unit causes said grinder unit stop arm to move said infuser piston stop arm to cause the release of the filter piston, which drops to the bottom of the infusion chamber.

4. Automatic coffee machine according to claim 1, wherein said means for moving the grinding unit causes the positioning of the channel chute for the introduction of the ground coffee into the infusion chamber.

5. Automatic coffee machine according to claim 1, wherein said supporting means for movement of the grinding unit brings about the measuring of the coffee beans from the feeder into the grinding chamber to be ground, based upon the volume of the grinding chamber.

6. Automatic coffee machine according to claim 1, wherein said supporting means for movement of the grinding unit causes the moving of said channel chute for the expulsion of a tablet of compressed and spent coffee grounds by said channel chute.

7. Automatic coffee machine according to claim 1, further comprising a body which can be inserted into the grinding chamber for the purpose of varying the useable volume of the grinding chamber and thereby also the quantity of coffee to be ground.

* * * * *